United States Patent
Hashizume et al.

(10) Patent No.: US 10,926,230 B2
(45) Date of Patent: Feb. 23, 2021

(54) SEMIPERMEABLE MEMBRANE

(71) Applicant: DAICEL CORPORATION, Osaka (JP)

(72) Inventors: Tomohiro Hashizume, Himeji (JP); Hiroyuki Matsumura, Himeji (JP); Tohru Shibata, Himeji (JP); Mitsuru Ohno, Himeji (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 16/091,728

(22) PCT Filed: Mar. 24, 2017

(86) PCT No.: PCT/JP2017/011922
§ 371 (c)(1),
(2) Date: Oct. 5, 2018

(87) PCT Pub. No.: WO2017/175600
PCT Pub. Date: Oct. 12, 2017

(65) Prior Publication Data
US 2019/0151806 A1 May 23, 2019

(30) Foreign Application Priority Data
Apr. 8, 2016 (JP) .............................. JP2016-078342
Mar. 7, 2017 (JP) .............................. JP2017-042753

(51) Int. Cl.
*B01D 71/14* (2006.01)
*B01D 69/06* (2006.01)
(Continued)

(52) U.S. Cl.
CPC ............ *B01D 71/14* (2013.01); *B01D 69/06* (2013.01); *B01D 69/08* (2013.01); *B01D 71/18* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,816,150 A | 6/1974 | Ishii et al. |
| 5,008,385 A | 4/1991 | Diamantoglou |

(Continued)

FOREIGN PATENT DOCUMENTS

| | | |
|---|---|---|
| JP | 49-26944 B1 | 7/1974 |
| JP | 789538 A1 | 12/1980 |

(Continued)

OTHER PUBLICATIONS

English translation of International Preliminary Report on Patentability and Written Opinion dated Oct. 18, 2018, in PCT/JP2017/011922 (Forms PCT/IB/326, PCT/IB/373, and PCT/ISA/237).

(Continued)

*Primary Examiner* — Ellen M McAvoy
*Assistant Examiner* — Chantel L Graham
(74) *Attorney, Agent, or Firm* — Birch, Stewart, Kolasch & Birch, LLP

(57) ABSTRACT

Provided is a semipermeable membrane having a high chlorine resistance. The semipermeable membrane is formed of a cellulose ester, the cellulose ester having an optionally substituted benzoyl group.

9 Claims, 1 Drawing Sheet

(51) Int. Cl.
  *B01D 69/08*   (2006.01)
  *B01D 71/18*   (2006.01)
  B01D 61/00   (2006.01)
  B01D 61/02   (2006.01)

(52) U.S. Cl.
  CPC .......... *B01D 61/002* (2013.01); *B01D 61/025* (2013.01); *B01D 2325/02* (2013.01); *B01D 2325/30* (2013.01)

(56) References Cited

U.S. PATENT DOCUMENTS

| | | | |
|---|---|---|---|
| 6,019,925 A | 2/2000 | Diamantoglou et al. | |
| 2004/0050800 A1* | 3/2004 | Ito | B01D 61/04 210/764 |
| 2013/0338250 A1* | 12/2013 | Umemoto | C08B 3/08 522/18 |
| 2015/0265976 A1 | 9/2015 | Shimizu et al. | |

FOREIGN PATENT DOCUMENTS

| | | | |
|---|---|---|---|
| JP | 64-36601 A | | 2/1989 |
| JP | 10-52630 A | | 2/1998 |
| JP | 2005-247935 A | | 9/2005 |
| JP | 2012092191 | * | 5/2012 |
| JP | 5418739 B1 | | 2/2014 |
| JP | 5471242 B2 | | 4/2014 |
| KR | 10-2012-0009820 A | | 2/2012 |
| RU | 2 209 658 C1 | | 8/2003 |
| SU | 789538 | * | 12/1980 |

OTHER PUBLICATIONS

International Search Report for PCT/JP2017/011922 dated May 23, 2017.
Khan et al., "Perfluoroacylated Ethyl Cellulose: Synthesis, Characterization, and Gas Permeation Properties", Macromolecules, 2006, vol. 39, No. 26, pp. 9208-9214, P9209 Scheme 1, [Pentafluorobenzoyl Derivative of Ethyl Cellulose (2e)], [Membrane Fabrication], Table 1-8.
Lee et al., "Preparation and characteristics of cross-linked cellulose acetate ultrafiltration membranes with high chemical resistance and mechanical strength", Reactive and Functional Polymers, 2016, vol. 99, pp. 114-121, P115 col. 2.2 and 2.3, Fig. 1.
Uragami et al., "Pervaporation characteristics for benzene/cyclohexane mixtures through benzoylcellulose membranes", Macromol. Chem. Phys., 1999, vol. 200, No. 9, pp. 1985-1990, Summary, P1986 [Benzoylation of cellulose], [Preparation of BzCell membrane].
Vyas et al., "Development and Characterization of Cellulose Acetate Benzoate Flat Osmotic Membranes", Journal of Applied Polymer Science, 1994, vol. 52, pp. 1031-1035, Introduction, Table I-XIV.
Written Opinion of the International Searching Authority for PCT/JP2017/011922 (PCT/ISA/237) dated May 23, 2017.
Extended European Search Report dated Nov. 7, 2019, in European Patent Application No. 17778979.9.

* cited by examiner

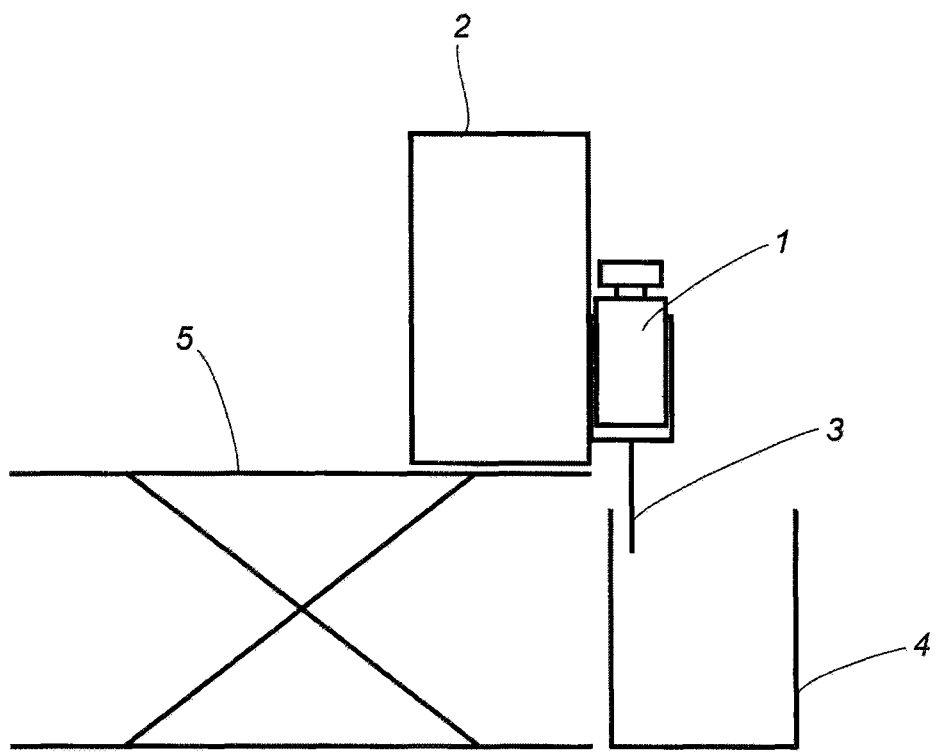

SEMIPERMEABLE MEMBRANE

FIELD OF THE INVENTION

The present invention relates to a semipermeable membrane usable for water treatment in various fields, and having a better chlorine resistance and alkali resistance compared to a cellulose triacetate membrane.

BACKGROUND OF THE INVENTION

Water treatment techniques using membranes formed of cellulose acetate as a membrane material are known.

JP-B 5471242 describes an invention of a water treatment method using an RO membrane resistant to chlorine and formed of cellulose triacetate, etc. (paragraph number 0031).

JP-B 5418739 describes an invention of a hollow fiber type semipermeable membrane formed of cellulose acetate for forward osmosis treatment. The paragraph number 0017 discloses that cellulose acetate is resistant to chlorine, which is a disinfectant, and that cellulose triacetate is preferable in terms of durability.

JP-A 10-52630 describes an invention of a manufacturing method for a cellulose dialysis membrane that is stable and storable, in the form of a planar membrane, a tubular membrane or a hollow fiber membrane, for low, medium or high flux. It discloses that modified cellulose is used as a film forming component.

SUMMARY OF THE INVENTION

The present invention aims to provide a semipermeable membrane formed of a cellulose ester, having a higher chlorine resistance and alkali resistance compared to a cellulose triacetate membrane.

The present invention provides a semipermeable membrane formed of a cellulose ester, the cellulose ester having an optionally substituted benzoyl group.

The semipermeable membrane of the present invention has a higher chlorine resistance and alkali resistance compared to a cellulose triacetate membrane.

BRIEF DESCRIPTION OF THE DRAWING

FIG. 1 shows an explanatory drawing of the production method for the porous filament in Example 1.

EMBODIMENTS OF THE INVENTION

The semipermeable membrane of the present invention is formed of a cellulose ester, the cellulose ester having an optionally substituted benzoyl group.

The optionally substituted benzoyl group is a benzoyl group or a benzoyl group having, on at least one of the ortho position, meta position or para position, at least one substituent such as an alkyl group such as a methyl group, a trifluoromethyl group, a tert-butyl group or a phenyl group, an alkoxy group such as a methoxy group or a phenoxy group, a hydroxy group, an amino group, an imino group, a carboxyl group, a sulfonate group, an acid group of the salts thereof, a halogeno group, a cyano group or a nitro group.

Among these, a group selected from a benzoyl group, a p-methylbenzoyl group, an o-methylbenzoyl group, a p-methoxybenzoyl group, an o-methoxybenzoyl group, an o-carboxylic acid (carboxylate) benzoyl group and a dimethylbenzoyl group is preferable since the chlorine resistance and alkali resistance are both high and they are easily available.

In order to increase the chlorine resistance and alkali resistance of the hollow fiber membrane, the degree of substitution of the optionally substituted benzoyl group is preferably within the range of 0.5 to 3.0, more preferably within the range of 1.0 to 3.0, further preferably within the range of 1.5 to 3.0, furthermore preferably within the range of 2.0 to 3.0, furthermore preferably within the range of 2.5 to 3.0.

In the present description, the degree of substitution of each substituent of the cellulose ester can be confirmed by $^1$H-NMR and $^{13}$C-NMR.

If the cellulose ester has substituents other than an optionally substituted benzoyl group, the other substituents can include groups derived from a fatty acid or a fatty acid ester such as an acetyl group, a propanoyl group and a butyroyl group, alkoxy groups such as a methoxy group and an ethoxy group, a carboxymethyl group, a hydroxyethyl group and a hydroxypropyl group.

The other substituents may be one kind of substituent or two or more kinds of substituents.

In the cellulose ester of the present invention, the sum value of the degree of substitution of the optionally substituted benzoyl group, the degree of substitution of other substituents and the degree of substitution corresponding to an unsubstituted hydroxy group (degree of hydroxy group substitution) is 3.0.

In the cellulose ester, unsubstituted hydroxy groups may remain, but in order to increase the chlorine resistance of the hollow fiber membrane, the number of unsubstituted hydroxy groups is preferably smaller, and the degree of substitution corresponding to an unsubstituted hydroxy group is preferably 1.5 or less, more preferably 0.5 or less.

The solubility parameter (Fedors method) of the cellulose ester is preferably 21.5 to 25.0 $(MPa)^{0.5}$, more preferably 22.5 to 25.0 $(MPa)^{0.5}$.

The solubility parameter is calculated by the solubility parameter calculation method of R. F. Fedors (Fedors method) described in Polymer Engineering and Science, Vol. 14, No. 2, P. 147-P. 154. The solubility parameter of water is 47.9 $(MPa)^{0.5}$.

As the cellulose ester, cellulose benzoate, cellulose acetate benzoate, cellulose propionate benzoate, cellulose butyrate benzoate, methyl cellulose benzoate, ethyl cellulose benzoate, etc., can be used, but due to having a water permeability and a low fouling performance similar to those of a cellulose triacetate membrane, cellulose benzoate and cellulose acetate benzoate are preferable.

The semipermeable membrane of the present invention is produced by using a cellulose ester having an optionally substituted benzoyl group, and a film forming solution including the cellulose ester, a solvent, and if needed, salts and a non-solvent can be used.

Examples of the solvents include N,N-dimethylformamide, N,N-dimethylacetamide, N,N-dimethyl sulfoxide (DMSO) and N-methyl-2-pyrrolidone (NMP), but N,N-dimethyl sulfoxide (DMSO) is preferable.

Examples of the non-solvents include ethylene glycol, diethylene glycol, triethylene glycol and polyethylene glycol.

Examples of the salts include lithium chloride, sodium chloride, potassium chloride, magnesium chloride and calcium chloride, but lithium chloride is preferable.

The concentrations of the cellulose ester and the solvent are preferably 10 to 35 mass % for cellulose ester and 65 to 90 mass % for solvent.

The salt is used in an amount of preferably 0.5 to 2.0 parts by mass based on 100 parts by mass of the total mass of the cellulose ester and the solvent.

The semipermeable membrane of the present invention can be produced by using the above film forming solution and utilizing a known production method, e.g. the production method described in the Examples of JP-B 5418739.

The semipermeable membrane of the present invention is preferably a hollow fiber membrane, a separation function membrane such as a reverse osmosis membrane or a forward osmosis membrane, or a flat membrane.

EXAMPLES

Production Example 1 (Production of the Cellulose Ester by Saponification and Benzoylation of Cellulose Diacetate)

900 g of an aqueous solution containing ammonia, and then 100 g of cellulose diacetate having a degree of acetyl substitution of 2.44 were placed in a round bottom flask equipped with an agitator and a cooling tube, and the mixture was stirred at room temperature.

After 24 hours, the solids were collected by suction filtration to obtain a wet cake containing the cellulose. The obtained wet cake was placed in 300 g of DMSO (N,N-dimethyl sulfoxide) and stirred at room temperature for 1 hour, and the solids were collected by conducting suction filtration again.

Next, this cellulose was dissolved by adding it to a solution containing 56 g of lithium chloride dissolved in 460 g of DMAC (N,N-dimethylacetamide) and stirring at 100° C.

The above cellulose solution was placed in a round bottom flask equipped with an agitator and a cooling tube and stirring was started. While continuing stirring, benzoyl chloride in an excess amount to the hydroxy group of the cellulose was added dropwise through a dropping funnel, and then the mixture was heated to 80° C. and stirring was continued.

The obtained reaction mixture was cooled to room temperature and methanol was added while stirring to form a precipitate. The precipitate was collected by suction filtration to obtain a wet cake of crude cellulose benzoate.

The obtained wet cake was washed by adding ethanol and stirring, and drained. After repeating this washing with ethanol three times, solvent substitution with water was conducted. Cellulose tribenzoate was obtained by drying with a hot air drier. The degree of substitution of the benzoyl group was 2.90.

The degree of substitution was confirmed by $^1$H-NMR and $^{13}$C-NMR.

Production Examples 2 to 5

The cellulose ester was obtained by using cellulose acetate having the degrees of acetyl group substitution shown in Table 1 and reacting benzoyl chloride in an excess amount to the hydroxy group of each cellulose acetate in the same manner as in Production Example 1.

Production Example 6

After benzoyl chloride in an excess amount was added in the same manner as in Production Example 1, the temperature was raised to 80° C. and stirring was continued for a longer duration than in Production Example 1 to obtain cellulose tribenzoate having a degree of substitution of the benzoyl group of 3.00.

The degree of substitution was confirmed by $^1$H-NMR and $^{13}$C-NMR.

TABLE 1

|  | Degree of acetyl group substitution | Degree of benzoyl group substitution | Degree of hydroxy group substitution | Degree of substitution of other substituents | Solubility parameter $(MPa)^{0.5}$ |
|---|---|---|---|---|---|
| Production Example 1 | 0 | 2.90 | 0.10 | 0 | 24.0 |
| Production Example 2 | 2.44 | 0.56 | 0 | 0 | 22.5 |
| Production Example 3 | 2.20 | 0.80 | 0 | 0 | 22.6 |
| Production Example 4 | 1.80 | 1.20 | 0 | 0 | 22.9 |
| Production Example 5 | 1.50 | 1.50 | 0 | 0 | 23.1 |
| Production Example 6 | 0 | 3.00 | 0 | 0 | 23.8 |

The solubility parameters of each cellulose ester of Production Examples 1 to 6 in Table 1 were calculated by the solubility parameter calculation method of R. F. Fedors (Fedors method) described in Polymer Engineering and Science, Vol. 14, No. 2, P. 147-P. 154.

Example 1 (Production of Hollow Fiber Membrane)

A hollow fiber membrane (inner diameter/outer diameter=0.8/1.3 mm) was produced using the cellulose acetate benzoate obtained in Production Example 2.

Cellulose acetate benzoate/DMSO/LiCl=21.0/78.0/1.0 (mass %) was used as the film forming solution.

The film forming method is as follows.

The film forming solution was sufficiently dissolved at 105° C., and was discharged at 80° C. from outside a dual spinneret. Water was also discharged as an inner coagulating liquid from the inner tube, then the solution was coagulated in a water tank at 50° C. and the solvent was sufficiently removed in a washing tank.

The obtained hollow fiber membrane was stored in a wet state without drying the water content, and each item shown in Table 2 was measured.

Example 2 (Production of Hollow Fiber Membrane)

A hollow fiber membrane (inner diameter/outer diameter=0.8/1.3 mm) was produced using the cellulose tribenzoate obtained in Production Example 6.

Cellulose tribenzoate/NMP (N-methylpyrrolidone)/DMSO=20.0/20.0/60.0 (mass %) was used as the film forming solution.

The production method was performed in the same manner as in Example 1.

Comparative Example 1

A hollow fiber membrane (inner diameter/outer diameter=0.8/1.3 mm) was produced by using cellulose triacetate, in the same manner as in Example 1. Each item shown in Table 2 was measured regarding the obtained hollow fiber membrane.

Comparative Example 2

A hollow fiber membrane (inner diameter/outer diameter=0.8/1.3 mm) was produced by using cellulose diacetate, in the same manner as in Example 1. Each item shown in Table 2 was measured regarding the obtained hollow fiber membrane.

Test Example 1 (Chlorine Resistance Test on Hollow Fiber Membrane)

Fifty hollow fiber membranes of each of Example 1, and Comparative Examples 1 and 2 (inner diameter/outer diameter=0.8/1.3 mm, 1 m long) were used.

With the value of the "tensile strength" of a hollow fiber membrane that is not immersed in a 500 ppm sodium hypochlorite aqueous solution as reference, the time (number of days) required for the value to fall below 900 of the reference value was found. The time (number of days) required to fall below 90% of the reference value was found by plotting the "tensile strength" of each measurement time and making a calibration curve.

The "tensile strength" was the average value of the eight membranes excluding the maximum and minimum values of the "tensile strength" measured for the ten membranes of the same sample.

Test Example 3 (Pure Water Permeability Coefficient)

With one end side of the hollow fiber membranes obtained in Examples 1 and 2 and Comparative Examples 1 and 2 closed, pure water was supplied at 0.1 MPa from the other end side, and the volume of pure water permeating from the hollow fiber membranes in a certain period of time was measured. The pure water permeability coefficient [$L/m^2 \cdot h$ (0.1 MPa)] was found by dividing this volume by the sampling time (h) and the membrane area ($m^2$) of the surface in the hollow fiber membrane.

TABLE 2

| | Degree of acetyl group substitution | Degree of benzoyl group substitution | Degree of hydroxy group substitution | Degree of substitution of other substituents | Solubility parameter $(Mpa)^{0.5}$ | Chlorine resistance [days] | Tensile strength [MPa] | Elongation [%] | Pure water permeability coefficient ($L/m^2 \cdot h$) |
|---|---|---|---|---|---|---|---|---|---|
| Example 1 | 2.44 | 0.56 | 0 | 0 | 22.5 | 30 | 7.7 | 17 | 406 |
| Example 2 | 0 | 3.00 | 0 | 0 | 23.8 | 70 or more | 4.7 | 7 | 239 |
| Comparative Example 1 | 2.87 | 0 | 0.13 | 0 | 22.4 | 5 | 6.4 | 29 | 510 |
| Comparative Example 2 | 2.44 | 0 | 0.56 | 0 | 23.8 | 3 | 6.4 | 40 | 272 |

An aqueous solution of sodium hypochlorite having an effective chlorine concentration of 500 ppm was used as the test solution. The effective chlorine concentration was measured using a handy water quality meter AQUAB, model AQ-102 manufactured by Sibata Scientific Technology Ltd.

The fifty hollow fiber membranes were immersed so as to be completely submerged in a plastic container filled with 1 L of a 550 ppm sodium hypochlorite aqueous solution as the test solution having a liquid temperature of about 25° C., a 550 ppm sodium hypochlorite aqueous solution was freshly prepared every 7 days, and the entire amount of the test solution was replaced.

Moreover, ten hollow fibers were taken out of the plastic container every 7 days, and after washing them with tap water, the water was wiped off and the tensile strength and elongation were measured in the wet state.

Test Example 2 (Measurement of "Tensile Strength" and "Elongation," and Method for Determining the Chlorine Resistance)

Using a small desktop test stand (EZ-Test manufactured by Shimadzu Corporation), the hollow fiber membranes in a wet state were pinched one by one so as to have a distance between chucks of 5 cm, and the measurements were performed at a tensile speed of 20 mm/min.

In Table 2, the "tensile strength" and "elongation" of Examples 1 and 2 and Comparative Examples 1 and 2 show the tensile strength and elongation of the hollow fiber membranes that are not immersed in an aqueous solution of sodium hypochlorite.

The chlorine resistances of the hollow fiber membranes of Examples 1 and 2 were 30 days and 70 days or more, respectively, which were much superior to the chlorine resistance of the hollow fiber membrane of cellulose triacetate of Comparative Example 1 and of cellulose diacetate of Comparative Example 2, which were 5 days and 3 days, respectively.

The production method (spinning method) of porous filaments for measuring the trend of physical properties of the hollow fiber membrane of the present invention is described below.

Reference Example 1

Using the cellulose ester obtained in Production Example 1, porous filaments were spun using the device shown in FIG. 1.

A predetermined amount of the solvent DMSO was put in a round bottom flask, cellulose ester was added at the mixing ratio described in Table 3 while stirring with a three-one motor, and then completely dissolved by heating with an oil bath.

The dissolved cellulose ester solution (dope) was transferred to a sample bottle, allowed to cool until reaching room temperature and degassed.

Porous filaments having a diameter of 0.5 mm were obtained by using syringe pump 2 from syringe 1 which has a nozzle having a diameter of about 0.5 mm set on the tip, discharging in mug 4 filled with water at 25° C. (injection solution 3), and substituting DMSO by water. Syringe pump 2 was supported by lab jack 5.

The obtained porous filaments were stored in a wet state without drying the water content, and the following measurements were performed. The results are shown in Table 3.

(Evaluation of the Chlorine Resistance)

Fifty porous filaments (diameter=0.5 mm, 10 cm long) were used.

An aqueous solution of sodium hypochlorite having an effective chlorine concentration of 500 ppm was used as the test solution. The effective chlorine concentration was measured using a handy water quality meter AQUAB, model AQ-102 manufactured by Sibata Scientific Technology Ltd.

The fifty porous filaments were immersed so as to be completely submerged in a plastic container with lid filled with 1 L of the 500 ppm sodium hypochlorite aqueous solution as the test solution that has a liquid temperature of about 25° C., a 500 ppm sodium hypochlorite aqueous solution was freshly prepared every 7 days, and the entire amount of the test solution was replaced.

Moreover, five porous filaments were taken out of the plastic container with lid every 7 days, and after washing them with tap water, the water was wiped off and the "tensile strength" and "elongation" were measured in the wet state.

(Evaluation of the Alkali Resistance)

Fifty porous filaments (diameter=0.5 mm, 10 cm long) were used.

10 g of NaOH pellets (purity of 97% or more) was added and dissolved in 1 L of pure water and the pH value was adjusted to 12.0 or 13.0 using phosphoric acid.

The fifty porous filaments were immersed so as to be completely submerged in a plastic container with lid filled with 1 L of the alkali aqueous solution having a pH value of 12.0 or 13.0 as the test solution that has a liquid temperature of 25° C., a new alkali aqueous solution having a pH value of 12.0 or 13.0 was prepared every 7 days, and the entire amount of the test solution was replaced.

Moreover, five porous filaments were taken out of the plastic container with lid at 2 h, 8 h, 24 h, 96 h and 240 h, and after washing them with tap water, the water was wiped off and the "tensile strength" and "elongation" were measured in the wet state.

(Measurement of the "Tensile Strength" and "Elongation," and Method for Determining the Chlorine Resistance and Alkali Resistance)

Using a small desktop test stand (EZ-Test manufactured by Shimadzu Corporation), the porous filaments in a wet state were pinched one by one so as to have a distance between chucks of 5 cm, and the measurements were performed at a tensile speed of 20 mm/min.

With the value of the "tensile strength" of the porous filament of the cellulose ester obtained in Production Example 1 that is not immersed in a 500 ppm sodium hypochlorite aqueous solution or an alkali aqueous solution having a pH value of 12.0 or 13.0 having a liquid temperature of 25° C. as reference, the time (number of days or hours) required for the value to fall below 90% of the reference value was found. The time (number of days or hours) required to fall below 90% of the reference value was found by plotting the "tensile strength" of each measurement time and making a calibration curve.

The "tensile strength" was the average value of the three filaments excluding the maximum and minimum values of the "tensile strength" measured for the five filaments of the same sample.

Reference Examples 2 to 6

For each cellulose ester obtained in Production Examples 2 to 6, the porous filaments were spun at the mixing ratios of the solvent and the cellulose ester described in Table 3, in the same manner as in Reference Example 1. The diameters of the porous filaments of Reference Examples 2 to 6 were all 0.5 mm. For the Production Examples 2 to 5, DMSO was used as the solvent for the spinning, and for Production Example 6, NMP was used as the solvent for the spinning.

Using the obtained porous filaments, the chlorine resistance and alkali resistance were evaluated with the "tensile strength" value of the porous filaments of each cellulose ester as reference. The results are shown in Table 3.

Comparative Reference Examples 1 and 2

Using cellulose triacetate as Comparative Reference Example 1 and cellulose diacetate as Comparative Reference Example 2 (both manufactured by Daicel Corporation), the porous filaments were spun (0.5 mm in diameter) at the mixing ratios of the solvent DMSO and the cellulose ester described in Table 3, and the chlorine resistance and alkali resistance were evaluated, in the same manner as in Reference Example 1. The results are shown in Table 3.

Comparative Reference Examples 3 and 4

In the same manner as in Comparative Reference Example 2, the cellulose ester was produced using cellulose diacetate and reacting acid chloride (pentyl chloride in Comparative Reference Example 3, cyclohexylcarboxylic acid chloride in Comparative Reference Example 4) in an excess amount to the hydroxy group, the porous filaments were spun (0.5 mm in diameter) at the mixing ratios of the solvent DMSO and the cellulose ester described in Table 3, and the chlorine resistance and alkali resistance were evaluated. The results are shown in Table 3.

TABLE 3

| | Degree of acetyl group substitution | Degree of benzoyl group substitution | Degree of hydroxy group substitution | Degree of substitution of other substituents | Solubility parameter $(MPa)^{0.5}$ | Cellulose ester/ solvent | Chlorine resistance [days] | Alkali resistance pH 12 [h] | Alkali resistance pH 13 [h] | Tensile strength [MPa] | Elongation [%] |
|---|---|---|---|---|---|---|---|---|---|---|---|
| Reference Example 1 | 0 | 2.90 | 0.10 | 0 | 24.0 | 20/80 | 70 or more | 200 | 57 | 6.2 | 8 |
| Reference Example 2 | 2.44 | 0.56 | 0 | 0 | 22.5 | 20/80 | 24 | 21 | 3 | 7.7 | 22 |

TABLE 3-continued

| | Degree of acetyl group substitution | Degree of benzoyl group substitution | Degree of hydroxy group substitution | Degree of substitution of other substituents | Solubility parameter (Mpa)$^{0.5}$ | Cellulose ester/ solvent | Chlorine resistance [days] | Alkali resistance pH 12 [h] | Alkali resistance pH 13 [h] | Tensile strength [MPa] | Elongation [%] |
|---|---|---|---|---|---|---|---|---|---|---|---|
| Reference Example 3 | 2.20 | 0.80 | 0 | 0 | 22.6 | 20/80 | 33 | 29 | 4 | 6.8 | 20 |
| Reference Example 4 | 1.80 | 1.20 | 0 | 0 | 22.9 | 25/75 | 35 | 40 | 11 | 7.4 | 8 |
| Reference Example 5 | 1.50 | 1.50 | 0 | 0 | 23.1 | 20/80 | 54 | 74 | 22 | 7.0 | 18 |
| Reference Example 6 | 0 | 3.00 | 0 | 0 | 23.8 | 20/80 | 70 or more | 200 | 200 or more | 7.5 | 10 |
| Comparative Reference Example 1 | 2.87 | 0 | 0.13 | 0 | 22.4 | 20/80 | 6 | 5 | 2 or less | 6.2 | 32 |
| Comparative Reference Example 2 | 2.44 | 0 | 0.56 | 0 | 23.8 | 20/80 | 3 | 2 or less | 2 or less | 3.9 | 26 |
| Comparative Reference Example 3 | 2.44 | 0 | 0 | 0.56(Pe) | 21.5 | 20/80 | 19 | — | — | 4.2 | 17 |
| Comparative Reference Example 4 | 2.44 | 0 | 0 | 0.56(CPh) | 21.7 | 20/80 | 14 | — | — | 4.2 | 14 |

In Table 3, the "tensile strength" and "elongation" of Reference Examples 1 to 6 and Comparative Reference Examples 1 to 4 show the tensile strength and elongation of porous filaments that are not immersed in a sodium hypochlorite aqueous solution or an alkali aqueous solution.

The trend of the measurements of Reference Examples 1 to 6 and Comparative Reference Examples 1 to 4 regarding the porous filaments shown in Table 3 is the same as the trend of the measurements of the hollow fiber membranes.

The porous filaments of Reference Example 1 had a chlorine resistance of 70 days and an alkali resistance of 200 h, which were much superior to cellulose triacetate (chlorine resistance=6 days, alkali resistance=5 hours).

For the porous filaments of Reference Examples 2 to 6, the higher the degree of substitution of the benzoyl group, the better the chlorine resistance and alkali resistance were.

The chlorine resistances of the porous filaments of Comparative Reference Examples 3 and 4 were 19 days and 14 days, respectively, which were inferior to the chlorine resistance of 24 days of the cellulose acetate benzoate (Reference Example 2) having the same degree of acetyl group substitution (2.44).

INDUSTRIAL APPLICABILITY

The hollow fiber membrane of the present invention can be utilized as a membrane for use in water purification facilities, seawater desalination facilities, sewage facilities, etc.

The invention claimed is:

1. A semipermeable membrane formed of a cellulose ester, the cellulose ester having an optionally substituted benzoyl group,
   wherein the cellulose ester has a degree of substitution of the optionally substituted benzoyl group within a range of 2.0 to 3.0.

2. The semipermeable membrane according to claim 1, wherein the optionally substituted benzoyl group is selected from a benzoyl group, a p-methylbenzoyl group, an o-methylbenzoyl group, a p-methoxybenzoyl group, an o-methoxybenzoyl group, an o-carboxylic acid (carboxylate) benzoyl group and a dimethylbenzoyl group.

3. The semipermeable membrane according to claim 1 or 2, wherein the cellulose ester has a solubility parameter (Fedors method) of 21.5 to 25.0 (MPa)$^{0.5}$.

4. The semipermeable membrane according to claim 1, which is a hollow fiber membrane, a separation function membrane or a flat membrane.

5. The semipermeable membrane according to claim 1, which is a hollow fiber membrane.

6. The semipermeable membrane according to claim 1, which is a separation function membrane.

7. The semipermeable membrane according to claim 6, wherein said separation function membrane is a reverse osmosis membrane or a forward osmosis membrane.

8. The semipermeable membrane according to claim 1, which is a flat membrane.

9. The semipermeable membrane according to claim 1, which is suitable for water purification, seawater desalination, or sewage treatment.

* * * * *